United States Patent
Steuer et al.

(10) Patent No.: US 10,915,383 B2
(45) Date of Patent: Feb. 9, 2021

(54) REMOTE SESSION INFORMATION BASED ON PROCESS IDENTIFIER

(71) Applicant: ENTIT SOFTWARE LLC, Sanford, NC (US)

(72) Inventors: Rotem Steuer, Yehud (IL); Alon Kolet, Yehud (IL); Sergey Pastukhov, Odessa (UA); Dmitriy Danilov, Odessa (UA); Yuriy Tsurkan, Odessa (UA)

(73) Assignee: MICRO FOCUS LLC, Santa Clara, CA (US)

( * ) Notice: Subject to any disclaimer, the term of this patent is extended or adjusted under 35 U.S.C. 154(b) by 67 days.

(21) Appl. No.: 15/327,599

(22) PCT Filed: Jul. 31, 2014

(86) PCT No.: PCT/US2014/049061
§ 371 (c)(1),
(2) Date: Jan. 19, 2017

(87) PCT Pub. No.: WO2016/018342
PCT Pub. Date: Feb. 4, 2016

(65) Prior Publication Data
US 2018/0217885 A1    Aug. 2, 2018

(51) Int. Cl.
*G06F 9/54*    (2006.01)
*H04L 29/08*   (2006.01)
*G06F 9/451*   (2018.01)

(52) U.S. Cl.
CPC .............. *G06F 9/547* (2013.01); *G06F 9/452* (2018.02); *H04L 67/08* (2013.01)

(58) Field of Classification Search
None
See application file for complete search history.

(56) References Cited

U.S. PATENT DOCUMENTS

| 6,463,459 | B1 * | 10/2002 | Orr ......................... H04L 67/08 709/203 |
| 8,607,054 | B2 | 12/2013 | Ramarathinam et al. |
| 8,745,236 | B2 | 6/2014 | Battersby et al. |
| 9,535,560 | B1 * | 1/2017 | Kominac ............ G06F 16/9577 |

(Continued)

FOREIGN PATENT DOCUMENTS

KR    20120108265 A    10/2012

OTHER PUBLICATIONS

International Search Report & Written Opinion received in PCT Application No. PCT/US2014/049061, dated Apr. 21, 2015, 12 pages.

*Primary Examiner* — Doon Y Chow
*Assistant Examiner* — Phuong N Hoang (57) ABSTRACT

A virtual desktop infrastructure (VDI) server is to receive a request from a client device to access an application on an application server, establish a session between the VDI server and the application server to allow the client device to access the application on the application server via the VDI server, obtain a process identifier of the session, obtain identity information of a user of the client device associated with a communication of the session based on the process identifier, and provide identity details of the user of the client device associated with the communication of the session to a monitor device that monitors access to the application on the application server.

18 Claims, 5 Drawing Sheets

(56) References Cited

U.S. PATENT DOCUMENTS

| | | | |
|---|---|---|---|
| 2007/0061590 A1* | 3/2007 | Boye | G06F 21/305 |
| | | | 713/186 |
| 2008/0028444 A1* | 1/2008 | Loesch | G06F 21/606 |
| | | | 726/4 |
| 2009/0158420 A1* | 6/2009 | Ks | H04L 12/4641 |
| | | | 726/15 |
| 2010/0042723 A1 | 2/2010 | Sundarrajan et al. | |
| 2011/0153838 A1 | 6/2011 | Belkine et al. | |
| 2011/0173608 A1 | 7/2011 | Buragohain et al. | |
| 2011/0276661 A1* | 11/2011 | Gujarathi | G06F 9/4445 |
| | | | 709/219 |
| 2012/0066607 A1* | 3/2012 | Song | G06F 9/5077 |
| | | | 715/737 |
| 2012/0089666 A1* | 4/2012 | Goswami | G06Q 10/103 |
| | | | 709/203 |
| 2012/0215836 A1 | 8/2012 | Yonekawa | |
| 2012/0246215 A1 | 9/2012 | Gopshtein et al. | |
| 2012/0317295 A1* | 12/2012 | Baird | H04L 67/02 |
| | | | 709/228 |
| 2013/0212653 A1* | 8/2013 | Hoghaug | G06F 21/34 |
| | | | 726/5 |
| 2013/0262560 A1* | 10/2013 | Ivashin | G06F 3/1454 |
| | | | 709/203 |
| 2014/0007232 A1 | 1/2014 | Abidi et al. | |
| 2014/0032761 A1 | 1/2014 | Beveridge | |
| 2014/0165164 A1 | 6/2014 | Pizurica et al. | |
| 2015/0012919 A1* | 1/2015 | Moss | G06F 9/455 |
| | | | 718/1 |
| 2016/0100015 A1* | 4/2016 | Levy | H04L 67/306 |
| | | | 709/227 |

* cited by examiner

REMOTE SESSION INFORMATION BASED ON PROCESS IDENTIFIER

BACKGROUND

Applications are commonly accessible online. One form of access to applications includes using a virtual desktop infrastructure platform. For example, a client can communicate with a server to implement a virtual machine and provide a remote session with an online application.

DETAILED DESCRIPTION

In the following description and figures, some example implementations of apparatus, systems, and/or methods for gathering user information are described. Some examples are described specifically for use with virtual desktop infrastructure ("VDI") systems. However, it should be noted that the apparatus, systems, and/or methods for gathering user information may be utilized in a wide variety of systems and applications, such as any system that receives requests from a single intermediary that originate from separate sources. Thus a reference to a VDI server or related subject matter is merely included to provide context for specific examples described herein.

A VDI server can be accessed by multiple clients and create a remote session for each client. However, only one entity, the VDI server, is communicating with the online application. This can make identification of real user details of users consuming (e.g. using) the online service difficult relative to direct connections with the web application. For example, a monitor solution watching an online application may not receive all the user details because they may not be known by the online application (e.g. they are not submitted in communications from the VDI server). In other words, the software solution view may be that only a single user is accessing the online application when, in fact, multiple users may be accessing the application. As used herein, the term "application" refers to a set of executable instructions that provide a service when executed by a processor resource.

Various examples described below relate to providing real user details from the VDI server based on the process identifier associated with a communication of a session between the VDI server and an application. The VDI server can obtain information of the process based on a utility application using a process identifier. For example, a call to an operating system ("OS") utility using a process identifier associated with a remote session can retrieve the internet protocol ('IP') address and the username of the remote session. This information can be sent to an analysis application and enrich the information received by the online application. In this manner, more real user details can be made available by using the resources of the VDI server and communicating the information from the VDI server along with the information from the online application of the remote session.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, and/or modify."

Figure 1:
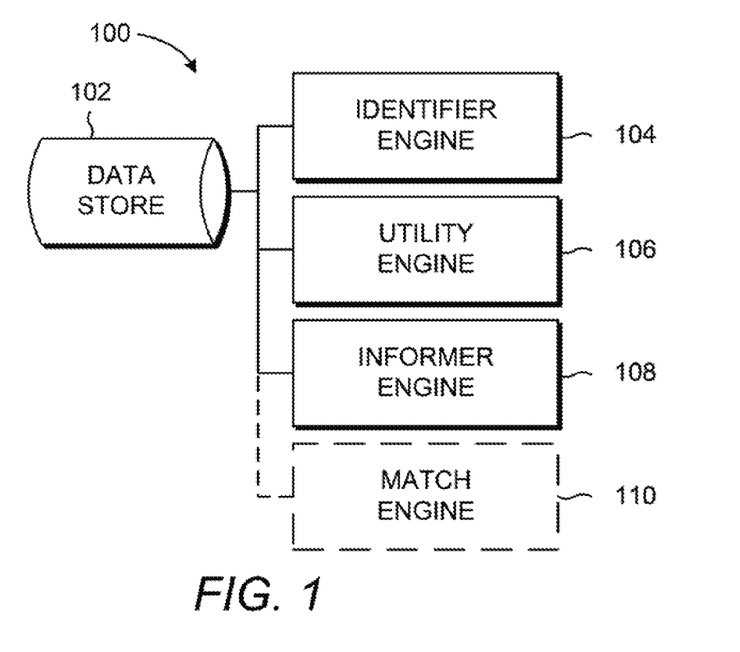
FIGS. 1 and 2 are block diagrams depicting example systems for gathering user information.
Figure 2:
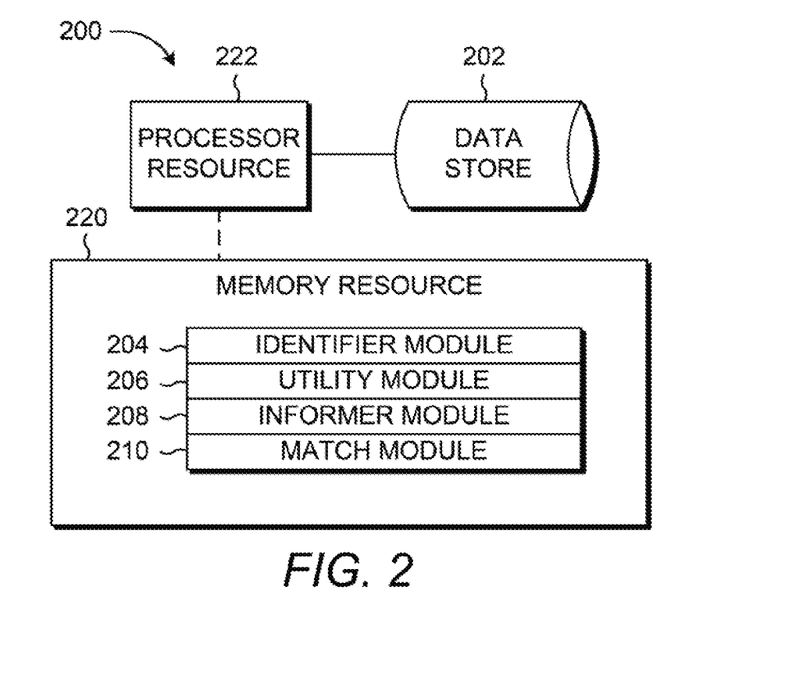

FIGS. 1 and 2 are block diagrams depicting example systems for gathering user information. Referring to FIG. 1, the example system 100 of FIG. 1 generally includes a data store 102, an identifier engine 104, a utility engine 106, and an informer engine 108. In general, the informer engine 108 can provide information obtained by the utility engine 106 based on the process identifier provided by the identifier engine 104. The example system can include a match engine 110 to merge identity details from the system 100 with other information associated with the identity.

The identifier engine 104 represents any circuitry or combination of circuitry and executable instructions to obtain a process identifier. A process identifier is a representation to uniquely identify a process. A process identifier can be a value, such as a four digit number. Alternatively, a process identifier can be any value, string, label, or other distinctive representation that represents a single process or set of related processes associated with a remote session. The identifier engine 104 can be used to identify a communication with an application because a process of the remote session (e.g. the process to communicate with the application) is associated with a process identifier. The process identifier can be same process identifier used by the OS to track a process of a compute device. Example processes include a remote browser process or other remote desktop processes to communicate with an application server hosting an application.

The process identifier can be obtained from a utility of an OS. For example, a process identifier can be selected from a plurality of process identifiers received via an application programming interface ("API") call to an OS utility. A utility, as used herein, is an application for use in retrieving information associated with processes of a system. For example, a network statistic utility provides information about network connections, including statistics related to processes, interfaces, and protocols associated with the network connections.

A utility can be used to obtain information via one of periodic execution of the utility and based on an event trace of the OS. For example, the network statistic utility can be executed on a schedule set by an administrator to provide the process identifiers of network communications since the previous execution of the utility. For another example, a utility can be an OS mechanism that functions based on events of the OS, such as providing a notification for every communication performed by a VDI server. A utility can retrieve information from an OS, such as the OS of a virtual machine, and/or a VDI server.

The utility engine 106 represents any circuitry or combination of circuitry and executable instructions to obtain information associated with the communication via an API based on the process identifier. For example, user details can be retrieved from a utility via an API, such as a VDI API, using the process identifier obtained by the identifier engine 104. User details include information associated with a user executing a process via VDI services to perform a communication with an application. Examples of user details include a client IP address, a port number, and a username.

The informer engine 108 represents any circuitry or combination of circuitry and executable instructions to provide identity details associated with the communication based on the information obtained by the utility engine 106. The informer engine 108 can provide the information via hypertext transfer protocol ("HTTP") or a dedicated channel. For example, a specific protocol and port number can be used by a monitoring solution and the informer engine 108 can communicate the user details to the monitoring solution using the particular protocol and port.

The match engine 110 represents any circuitry or combination of circuitry and executable instructions to correlate the information provided by the informer engine 108 (e.g. real user details retrieved by the utility engine 106) with a remote session. The information can be merged with information from the application by identifying matching information. For example, an IP address can be one of the identity details and the identity details can be merged with information reported from a web application (i.e. an application available via the Internet) having the same IP address. For another example, the information received from the informer engine 108 can be directly correlated to a real user identity, and the information from the VDI server can be added to the information received from the web application associated with that identity.

The information obtained by the utility engine 106 is linkable to an identity of the remote session. The information received by the match engine 110 can correlate to an identity based on the information itself or in combination with information received by another source, such as an application that communicates with a VDI server. For example, portions of the information that when analyzed together isolate an identity as the source of the communication. For another example, the information received by the match engine 110 may include an IP address and the information from the application may provide sufficient information to link that IP address to a username and identity. An identity is the source entity for the communication with the application. For example, the identity is the real user named "John Doe" who is operating a client device and executing the application under the username "johndoe." In this manner the identity can be identified based on a correlation of the information of the utility with an identity using the VDI server. For example, the VDI server may track users utilizing the VDI service and the information associated with the communications with the application can be compared to a list of users tracked by the VDI server.

The data store 102 can contain information utilized by the engines 104, 106, 108, and 110. For example, the data store 102 can store a process identifier, information from a utility, an identity, an API, and the like.

FIG. 2 depicts the example system 200 for gathering user information can be implemented on a memory resource 220 operatively coupled to a processor resource 222. The processor resource 222 can be operatively coupled to a data store 202. The data store 202 can be the same as the data store 102 of FIG. 1.

Referring to FIG. 2, the memory resource 220 can contain a set of instructions that are executable by the processor resource 222. The set of instructions can implement the system 200 when executed by the processor resource 222. The set of instructions stored on the memory resource 220 can be represented as an identifier module 204, a utility module 206, an informer module 208, and a match module 210. The identifier module 204, the utility module 206, the informer module 208, and the match module 210 represent program instructions that when executed function as the identifier engine 104, the utility engine 106, the informer engine 108, and the match engine 110 of FIG. 1, respectively.

The processor resource 222 can carry out a set of instructions to execute the modules 204, 206, 208, 210, and/or any other appropriate operations among and/or associated with the modules of the system 200. For example, the processor resource 222 can carry out a set of instructions to select a process identifier for a process, query one of a VDI server and an OS utility to retrieve real user details for the process based on the process identifier, and provide (e.g. report) the real user details for a session associated with the first communication to a request application during which the process executed. In that example, the request application can be one of a monitoring application, a web application, and a business analytics application that receives real user details for a session via hypertext transfer protocol sent from the VDI server. For another example, the processor resource 222 can carry out a set of instructions to correlate the process identifier with one of a username and an internet protocol address, merge the real user details with information monitored from an application server hosting a web application, and identify a real user causing the application server to execute the process in communication with the web application via a web browser. For yet another example, the processor resource 222 can carry out a set of instructions to check an OS utility for a process identifier periodically or receive notifications based on an event trace supplied by an OS mechanism of a VDI server when communicating with a web application and provide that information to monitor for real user analysis.

Figure 4A:
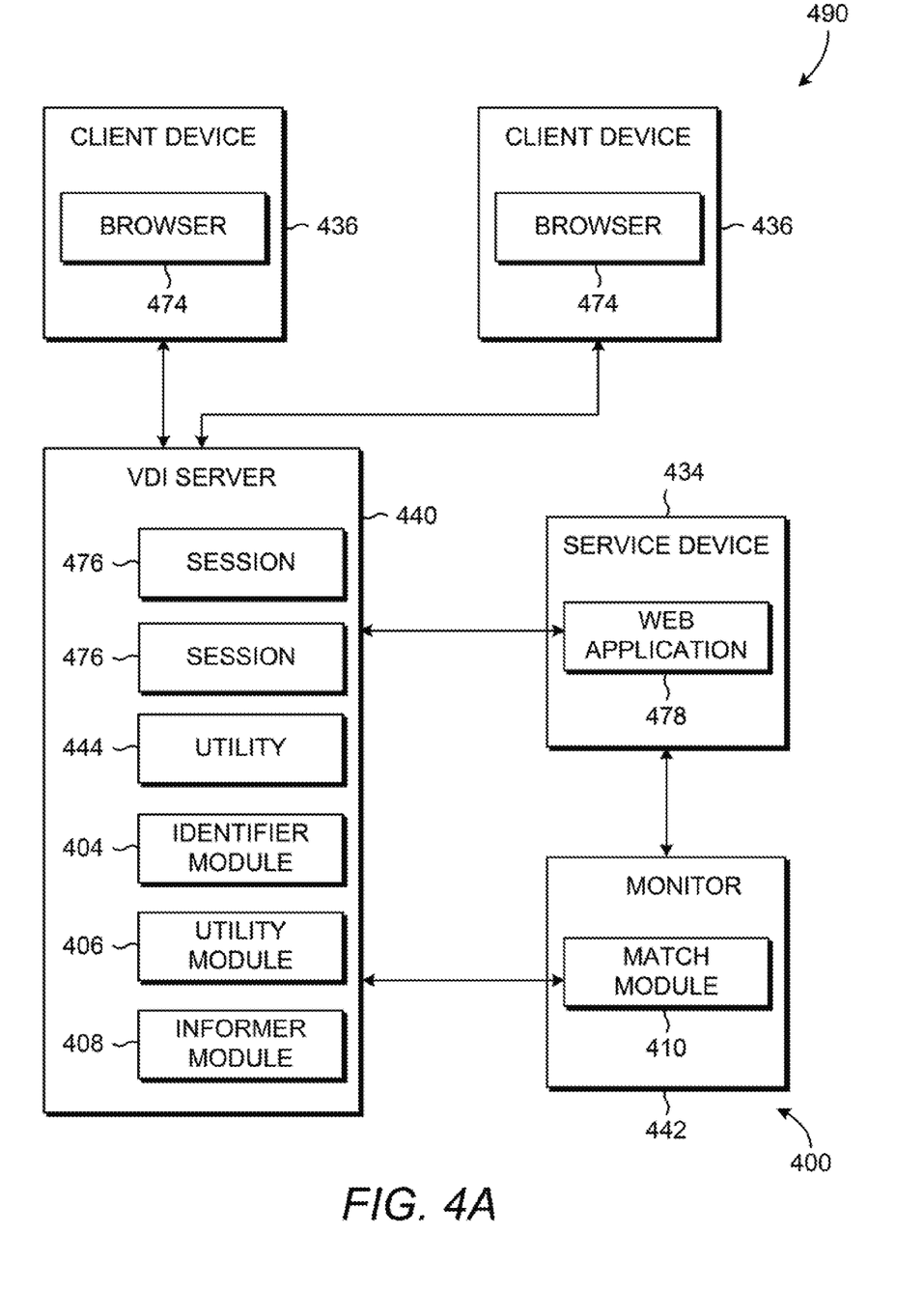
Figure 4B:
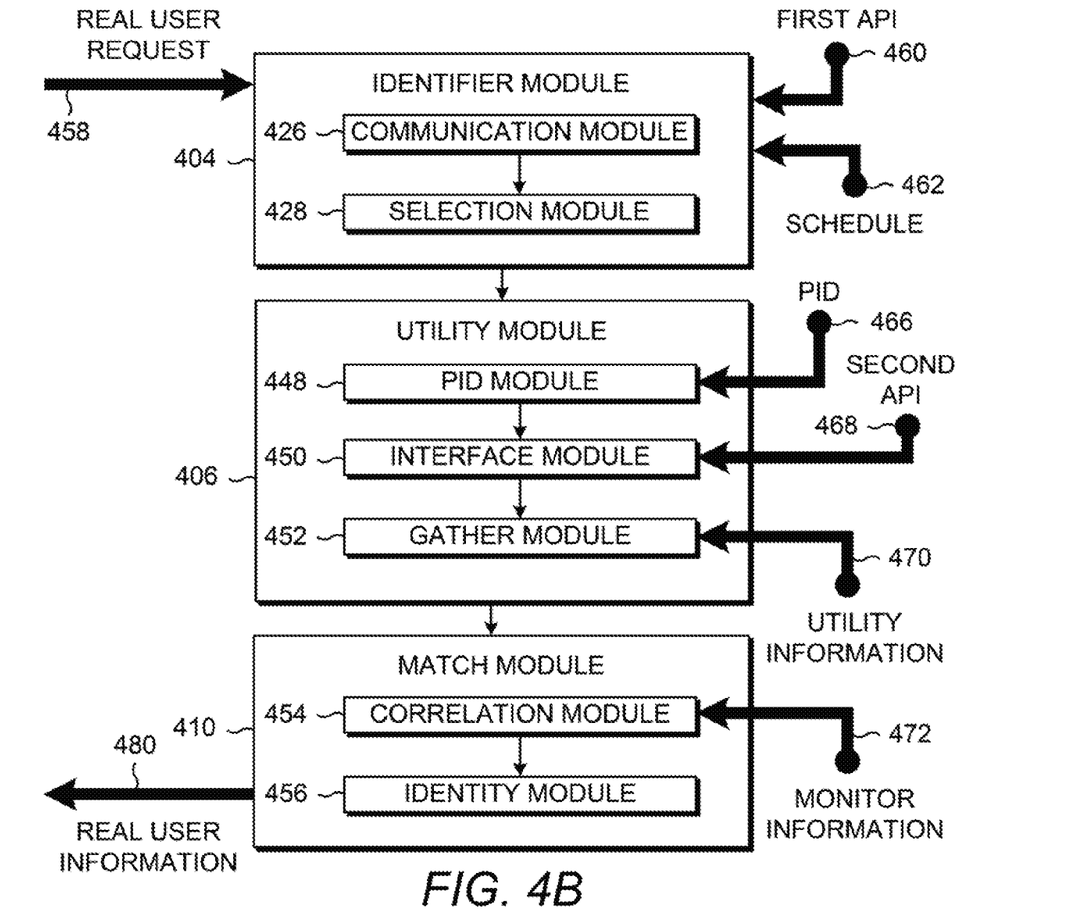
FIG. 4B depicts example modules used to implement example systems of gathering user information.

Although these particular modules (i.e. combinations of hardware and software) and various other modules are illustrated and discussed in relation to FIG. 2 and other example implementations, other combinations or sub-combinations of modules can be included within other implementations. Said differently, although the modules illustrated in FIG. 2 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. FIGS. 4A and 4B depict yet other examples of how functionality can be organized into modules.

The processor resource 222 can be any appropriate circuitry capable of processing (e.g. compute) instructions. For example, the processor resource 222 can be a central processing unit ("CPU") that enables gathering user information by fetching, decoding, and executing modules 204, 206, 208, and 210. Example processor resources 222 include CPUs, semiconductor-based microprocessors, application specific integrated circuits ('ASIC'), a field-programmable gate array ("FPGA"). The processor resource 222 can be one or multiple processing elements capable of retrieving instructions from the memory resource 220 and executing those instructions. Such multiple processing elements can be integrated in a single device or distributed across devices.

The processor resource 222 can process the instructions serially, concurrently, or in partial concurrence.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine readable, such as computer readable. The medium can be an electronic, magnetic, optical, or other physical storage device that is capable of containing (i.e. storing) executable instructions. The memory resource 220 can be said to store program instructions that when executed by the processor resource 222 implements the system 200 of FIG. 2. The memory resource 220 can be integrated in the same device as the processor resource 222 or it can be separate but accessible to that device and the processor resource 222. The memory resource 220 can be distributed across devices. The memory resource 220 and the data store 202 can represent the same physical medium or separate physical mediums. The data of the data store 202 can include representations of data and/or information mentioned herein.

In the discussion herein, the engines 104, 106, 108, and 110 of FIG. 1 and the modules 204, 206, 208, and 210 of FIG. 2 have been described as circuitry or a combination of circuitry and executable instructions. Such components can be implemented in a number of fashions. Looking at FIG. 2, the executable instructions can be processor executable instructions, such as program instructions, stored on the memory resource 220, which is a tangible, non-transitory computer readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

In one example, the executable instructions can be part of an installation package that when installed can be executed by the processor resource 222 to implement the system 200. In that example, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

Figure 3:
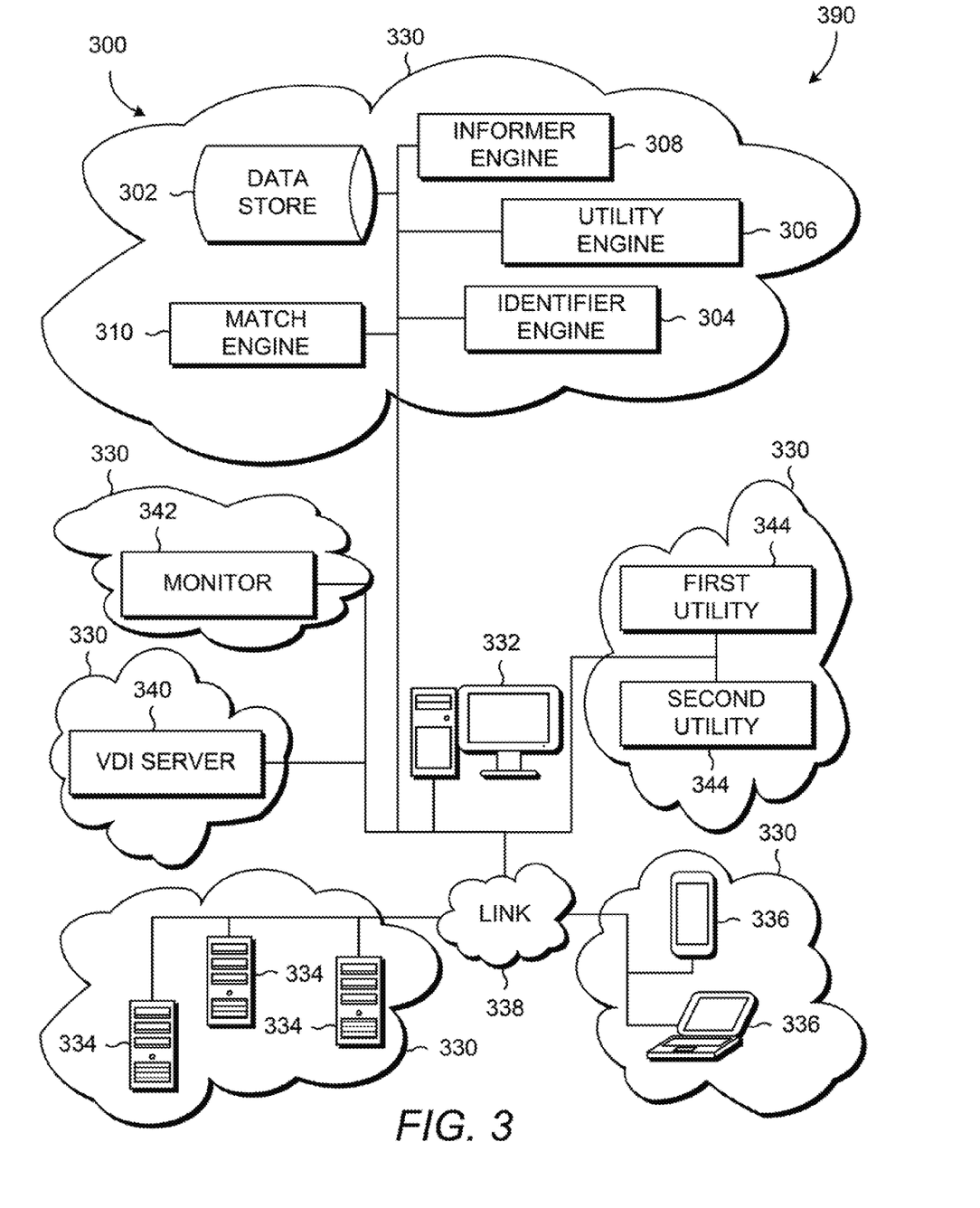
FIGS. 3 and 4A depict example environments in which various systems for gathering user information can be implemented

FIGS. 3 and 4A depict example environments in which various example systems for gathering user information can be implemented. The example environment 390 is shown to include an example system 300. The system 300 (described herein with respect to FIGS. 1 and 2) can represent generally any circuitry or combination of circuitry and executable instructions to gather user information. The system 300 can include an identifier engine 304, a utility engine 306, an informer engine 308, and a match engine 310 that are the same as the identifier engine 104, the utility engine 106, the informer engine 108, and the match engine 110 of FIG. 1, respectively, and the associated descriptions are not repeated for brevity. As shown in FIG. 3, the engines 304, 306, 308, and 310 can be integrated into a compute, such as a service device 334 or VDI server 340. The engine 304, 306, 308, and 310 can be integrated via circuitry or as installed instructions into a memory resource of the compute device.

The example environment 390 can include compute devices, such as administrator devices 332, service devices 334, client devices 336, VDI servers 340, and monitors 342. An administrator can use an administrator device 332 to set monitoring and other system parameters, such as a schedule for periodic checking for process and/or information associated with processes. The service devices 334 represent generally any compute devices to respond to a network request received from a client device 336, whether virtual or real. For example, the service device 334 can operate a combination of circuitry and executable instructions to provide a network packet in response to a request for a page or functionality of an application. The client devices 336 represent generally any compute devices to communicate a network request and receive and/or process the corresponding responses. For example, a browser application may be installed on the client device 336 to receive the network packet from the service device 334 and utilize the payload of the packet to display an element of a page via the browser application. The VDI server 340 can be any appropriate compute device configured to provide remote sessions and act as an intermediary for retrieving services of the service devices 334. For example, a client device 336 can connect to the VDI server 340 to create a remote session on a virtual machine of the VDI server to access the services provided by the service device 334. The monitor 342 represents circuitry or a combination of circuitry and executable instructions to provide a monitoring solution of network communications and/or network devices, such as a monitoring solution to track user actions with the services provided by service devices 334. The utilities 344 can be accessed, as described herein, to obtain information associated with sessions provided by the VDI server.

The compute devices can be located on separate networks 330 or part of the same network 330. The example environment 390 can include any appropriate number of networks 330 and any number of the networks 330 can include a cloud compute environment. For example, networks 330 can be distributed networks comprising virtual computing resources or "clouds." Any appropriate combination of the system 300 and compute devices can be a virtual instance of a resource of a virtual shared pool of resources. The engines and/or modules of the system 300 herein can reside and/or execute "on the cloud" (e.g. reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 104, 106, 108, and 110 of FIG. 1 and/or the modules 204, 206, 208, and 210 of FIG. 2 can be distributed across devices 332, 334, 336, 340, 342 or a combination thereof. The engine and/or modules can complete or assist completion of operations performed in describing another engine and/or module. For example, the utility engine 308 of FIG. 3 can request, complete, or perform the methods or operations described with the utility engine 108 of FIG. 1 as well as the identifier engine 104 and the informer engine 108 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. The engines of the system 300 can perform example methods described in connection with FIGS. 4B and 5-7.

FIG. 4A depicts an example environment 490 in which the modules of the example system 400 are distributed across the VDI server 440 and the monitor 442. As shown in FIG. 4A, the identifier module 404, the utility module 406, and the informer module 408 are implemented on the VDI server 440 and the match module 410 is implemented on the monitor 442. For example, a light weight agent can be installed on the VDI server to provide communication with a monitor 442 via dedicated channel to merge real user information from the VDI server and the web application. The modules 404, 406, 408, and 410 of FIG. 4A represent the modules 204, 206, 208, and 210 of FIG. 2 respectively. Also, the client devices 436, the service device 434, the VDI server 440, and the monitor 442 represent the client devices 336, the server devices 334, the VDI server 340, and the monitor 342 of FIG. 3 respectively.

For simplicity, FIG. 4A depicts two client devices 436 connecting to the VDI server 440 via browsers 474. Accordingly, the VDI server hosts two sessions 476, one session per connected client. Via the sessions 476, the client devices 436 communicate with the service device 434 to access the services of the web application 478. The monitor 442 can receive information associated with the requests from the VDI server 440 completed by the web application 478. The monitor 442 may not receive the complete information regarding the users of the client devices 436 and their interaction from the web application 478 due to the VDI platform of the VDI server 440. The VDI server 440 can use the identifier module 404, the utility module 406, and the informer module 408 to, based on utilities 444 on the VDI server 440, identify the process identifier and the information, such as user details, associated with the process identifier and send that information to the monitor 442. The information sent via a dedicated channel between the VDI server and the monitor 442 can enrich the information provided by the service device 434 regarding the web application 478 and provide an improve profile of the real user's actions with the web application 478.

FIG. 4B depicts data and interactions amongst example modules used to implement example systems for gathering user information. Referring to FIG. 4B, the example modules of FIG. 4B generally include the identifier module 404, the utility module 406, and the match module 410. The example modules of FIG. 4B can be implemented on a compute device, such as the VDI server 440 and the monitor 442 of FIG. 4A.

The VDI server 440 can cause retrieval of real user information 480 based on a real user request 458, such as a request from a monitor solution or based on a periodic schedule 462. The identifier module 404 can use a first API 460 to retrieve a communication from a utility and the process identifier ("PID") 466 associated with the process performing the communication. The identifier module 404 can include program instructions, such as the communication module 426 and the selection module 428, that when executed cause a processor resource to identify communications between the VDI server and the application and select the process identifiers associated with the communications.

The utility module 406 can include program instructions, such as a PID module 448, an interface module 450, and a gather module 452, that when executed on a processor resource facilitate obtaining information regarding a communication of the remote session via a utility. The PID module 448 represents program instructions to receive the PID 466 identified by the identifier module 404. The interface module 450 represents program instructions to identify the utility and identify the API call to the utility to retrieve information using a second API 458. The gather module 452 represents program instructions to retrieve information 470 from the utility based on the API 458. The information 470 can be transferred to the match module 410 via the informer module 408 (not shown in FIG. 4B).

The match module 410 can include program instructions, such as correlation module 454 and the identity module 456 that when executed by a processor resource facilitate matching the monitor information 472 (utility information 470 and application information from the application communicated with by the VDI server) with an identity. The correlation module 454 represents program instructions to merge the monitor information 472 and organize the monitor information 472 based on the remote sessions and/or identities identified from process identifiers. The monitor information 472 can be correlated based on matching portions of information. The identity module 456 represents program instructions to identity the real user associated with the merged and organized monitor information 472. The real user information 480 can be parsed by the match module 410 and provided to an analytics solutions or other application requesting real user information.

Figure 5:
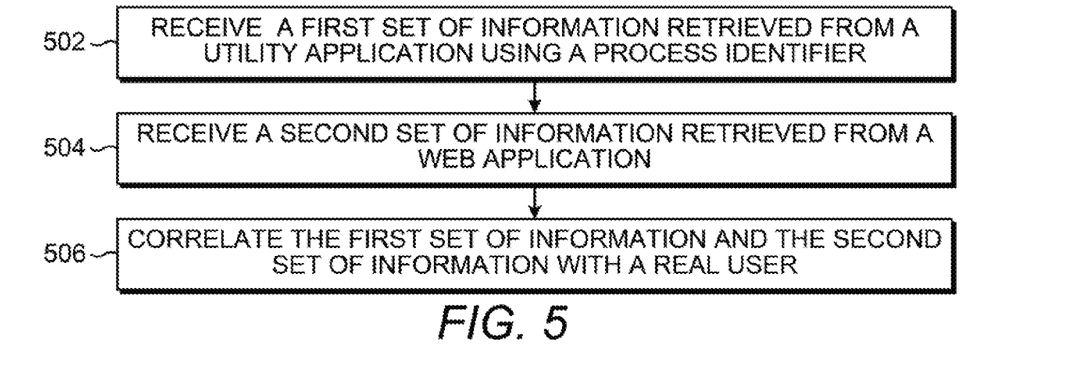
FIGS. 5-7 are flow diagrams depicting example methods of gathering user information.
Figure 6:
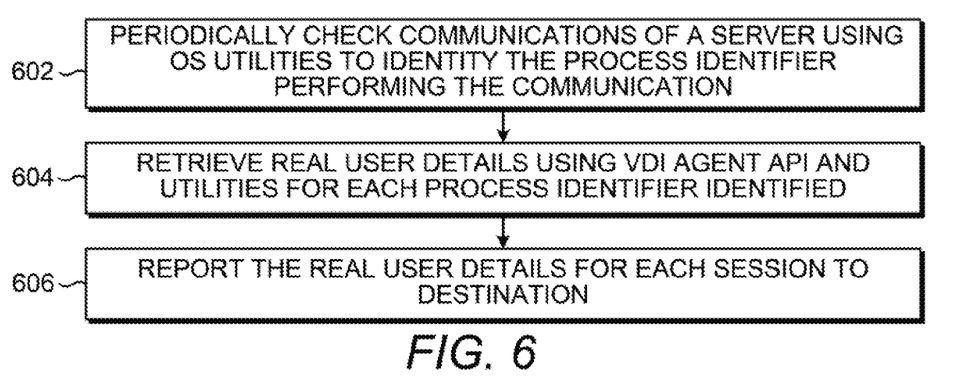
Figure 7:
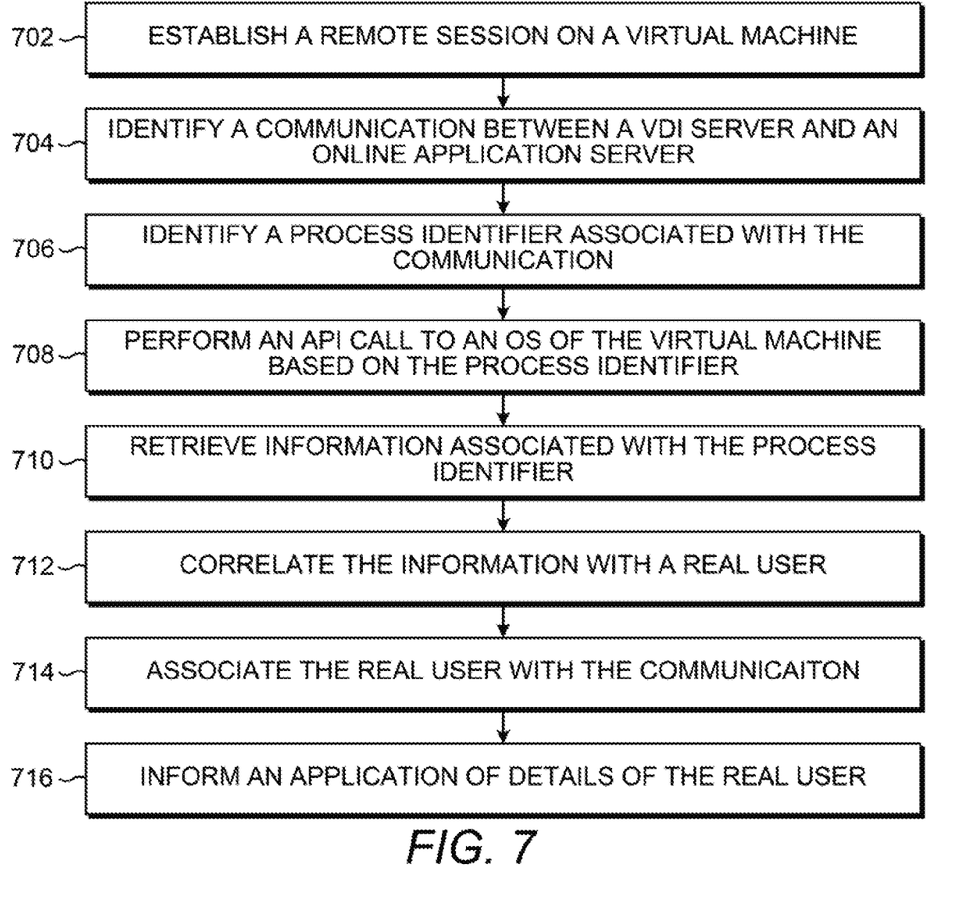

FIGS. 5-7 are flow diagrams depicting example methods of gathering user information. Referring to FIG. 5, example methods of gathering user information can generally include receiving information from a utility application, receiving information from an online application, and correlating the information to a real user.

At block 502, a first set of information is received. The first set of information is retrieved from a utility application using a process identifier that is associated with a process of a session for access to an online application. The utility application is to execute on an OS of a virtual machine providing the session. At block 504, a second set of information is received. The second set of information is retrieved from an online application based on a communication between the virtual machine and the online application during the session.

At block 506, the first set of information and the second set of information are correlated with a real user. For example, the first set of information and the second set of information can be matched and merged based on the IP address within each set of information. In that example, a real user associated with the first set of information and second set of information can be identified based on the IP address. The first set of information and the second set of information can be analyzed to enrich the statistics associated with the real user. For example, details of the real user (i.e. the user who interacted with the online application during the session on the VDI server) can be extracted from the merged information and provided to a business analytics solution. Example data to provide can include a log or string of characters, such as "TCP connection 65.123.4.7: 8899<->123.45.6.7:80 is performed by John (1.1.1.1)." In that example, 65.123.4.7 can refer to the VDI server and 123.45.6.7 can refer to the application server.

FIG. 6 includes blocks related to blocks of FIG. 5 and provides additional details generally regarding example methods for gathering user information using utilities associated with the VDI server session.

At block 602, communications of a server are periodically checked using OS utilities to identify the process identifier performing each communication. At block 604, the real user details are retrieved for each process identifier identified at block 602 using a VDI agent API and utilities. Retrieving information about the operation environment and context (e.g. the operating system and the VDI system) can provide useful information to relate to a real user. At block 606, the real user details for each session are reported to a destination. The destination can include a monitor, a business analytics application, a web application, or a separate device that requests information regarding real users. For example, the destination can be a monitoring solution that performs functionality discussed in the description of FIG. 5.

FIG. 7 depicts another example method of gathering user information. At block 702, a remote session is established on a virtual machine. The virtual machine can be provided by a VDI server to host a connection to an online application. A user can use a client device to communicate with the online application via a VDI server on behalf of the user. For example, the VDI browser can communicate with the online application via HTTP. For another example, the VDI server may use a protocol to communicate with the online application that is one of a proprietary protocol and a non-web protocol (e.g. a protocol that does not use HTTP).

At block 704, a communication between a virtual machine of a VDI server and an online application server. At block 706, a process identifier associated with the communication identified at block 704. An API call is performed to an OS of the virtual machine based on the process identifier at block 708. At block 710, information associated with the process identifier is retrieved. For example, the API call to a utility application at block 708 can retrieve a first set of information associated with the process identified by the process identifier. The utility used to retrieve the first set of information can be located on a VDI server, and the information can be retrieved periodically or based on a system event.

At block 712, the information retrieved at block 710 can be correlated to a real user. For example, the information may include a username or IP address that is directly associated with a real user based on the user information retrievable from the VDI server or hosted by a monitor. For another example, the information can be correlated similar to the description of block 506 of FIG. 5. At block 714, the communication can be associated with the real user identified at block 712. In this manner, any information of the communication, such as metadata, or analytics of the information can be attributed to the real user for real user analysis purposes. At block 716, an analysis application can be informed of the details of the real user associated with the session. The analysis application can execute on a monitor device, a web server, or other service device, such as a device hosting a business intelligence application. For example, the VDI server can provide the real user details identified at blocks 710-714 to a monitoring application via HTTP. For another example, the VDI server may use one of a proprietary protocol and a non-web protocol to inform a monitor and/or application of details of the real user.

Although the flow diagrams of FIGS. 5-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims.

What is claimed is:

1. A virtual desktop infrastructure (VDI) server comprising:
   a processor; and
   a memory storing instructions that when executed cause the processor to:
   in response to a request from a client device to access a web application hosted by an application server, establish a remote session between the VDI server and the web application to allow the client device to access the web application via the VDI server, wherein the VDI server, the client device, and the application server are separate from each other;
   obtain a process identifier that identifies a communication of the remote session between the VDI server and the web application, wherein the process identifier is obtained via a first application programming interface (API) of the VDI server;
   retrieve information of the remote session using the process identifier;
   obtain identity information of a user of the client device, including an Internet Protocol (IP) address associated with the user, by performing an API call to an operating system of the VDI server based on the process identifier of the remote session;
   correlate the identity information of the user with the information of the remote session, including matching the IP address in the identity information of the user to an IP address reported from the web application in the information of the remote session; and
   provide the identity information of the user associated with the information of the remote session to a monitor device that monitors the web application.

2. The VDI server of claim 1, wherein the instructions are executable to cause the processor to obtain the identity information via one of:
   a periodic execution of network statistic utility of the operating system of the VDI server; and
   an event trace of the operating system, wherein the instructions are executable to cause the processor to receive a notification for the communication when the VDI server performs the communication associated with the process identifier.

3. The VDI server of claim 1, wherein the instructions are executable to cause the processor to:
   merge the identity information of the user with the information of the remote session reported from the web application; and
   identify identity of the user based on the correlation of the information of the remote session with the identity information of the user.

4. The VDI server of claim 3, wherein:
   the identity information of the user of the client device is unknown to the web application and is obtained via a second API of the VDI server, wherein the second API is one of an operating system API and a VDI API; and the instructions are executable to cause the processor to correlate portions of the identity information of the user that in combination isolate the identity of the user, wherein the identity of the user is an identity of an entity.

5. The VDI server of claim 1, wherein the monitor device is communicatively coupled to the VDI server.

6. A non-transitory computer readable storage medium in a virtual desktop infrastructure (VDI) server, storing a set of instructions executable by a processor resource to:

in response to a request from a client device to access a web application hosted by an application server, establish a session between the VDI server and the application server to allow the client device to access the web application via the VDI server, wherein the VDI server, the client device, and the application server are separate from each other;

identify a process identifier that identifies a first communication of the session between the VDI server and the application server, wherein the process identifier is identified via a first application programming interface ("API") call of a first operating system utility of the VDI server;

retrieve information of the session using the process identifier;

retrieve real user details of a real user of the client device, including an Internet Protocol (IP) address associated with the real user, by performing a second API call of a second operating system utility of the VDI server based on the process identifier, wherein the real user details of the real user are unknown to the application server;

correlate the real user details of the real user with the information of the session, including matching the IP address in the real user details to an IP address reported from the web application in the information of the session; and provide the real user details for the session associated with the first communication to a request application that monitors access to applications at the application server.

7. The non-transitory computer readable storage medium of claim 6, wherein the set of instructions is executable by the processor resource to:

merge the real user details with information monitored from the application server; and identify the real user that caused the first communication between the VDI server and the application server.

8. The non-transitory computer readable storage medium of claim 6, wherein the set of instructions is executable by the processor resource to:

check the first operating system utility of the VDI server periodically; and receive notifications based on an event trace supplied by an operating system mechanism of the VDI server.

9. The non-transitory computer readable storage medium of claim 6, wherein the set of instructions executable by the processor resource to provide the real user details includes instructions to cause the processor resource to:

send the real user details for the session via a hypertext transfer protocol request.

10. The non-transitory computer readable storage medium of claim 6, wherein the request application is one of a monitoring application and a business analytics application.

11. A method of gathering user information comprising:

in response to a request from a client device to access an online application hosted by an application server, establishing, by a processor of a virtual desktop infrastructure (VDI) server, a session between the VDI server and the application server to allow the client device to access the online application via the VDI server, wherein the VDI server, the client device, and the application server are separate from each other;

obtaining, by the processor, a process identifier that identifies a process of the session between the VDI server and the application server;

obtaining, by the processor of the VDI server, information related to the session from a utility application using the process identifier of the process of the session, the utility application to execute on an operating system (OS) of the VDI server providing the session;

obtaining, by the processor, identity information of a user of the client device, including an Internet Protocol (IP) address associated with the user, by performing an application programming interface (API) call to the OS of the VDI server based on the process identifier of the process of the session;

correlating, by the processor of the VDI server, the identity information of the user with the information of the session, including matching the IP address in the identity information of the user to an IP address in the information of the session; and providing, from the VDI server to a monitor solution that monitors the online application, the identity information of the user associated with the information of the session.

12. The method of claim 11, comprising:

merging the identity information of the user with the information of the session.

13. The method of claim 12, further comprising:

identifying identity of the user based on the identity information of the user and the information of the session.

14. The method of claim 11, wherein obtaining the information of the session is performed via utilities on the VDI server based on one of a periodic schedule or a system event.

15. The method of claim 11, wherein providing the identity information of the user comprises:

informing the monitor solution implemented on one of a monitor, a business intelligence application, and a web application server about the identity information of the user associated with the session.

16. The method of claim 11, comprising:

communicating with the online application via an interface of the VDI server on behalf of the user, wherein a protocol to communicate with the online application is one of a proprietary protocol and non-web protocol.

17. The method of claim 11, wherein the identity information of the user of the client device is unknown to the online application and is obtained via an API of the VDI server.

18. The method of claim 11, further comprising: correlating portions of the identity information of the user that in combination isolate an identity of the user.

* * * * *